United States Patent
Watanabe et al.

(10) Patent No.: US 7,622,838 B2
(45) Date of Patent: Nov. 24, 2009

(54) AXIAL FAN MOTOR

(75) Inventors: Masanori Watanabe, Hitachinaka (JP); Taku Iwase, Mito (JP); Osamu Sekiguchi, Ryugasaki (JP); Taro Tanno, Kiryu (JP); Yoshihiko Kato, Ota (JP); Tetsuya Hioki, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 279 days.

(21) Appl. No.: 11/697,749

(22) Filed: Apr. 9, 2007

(65) Prior Publication Data
US 2007/0241643 A1 Oct. 18, 2007

(30) Foreign Application Priority Data

| Apr. 14, 2006 | (JP) | ............................... 2006-111503 |
| Oct. 31, 2006 | (JP) | ............................... 2006-296235 |

(51) Int. Cl.
*H02K 5/00* (2006.01)
(52) U.S. Cl. .................... 310/91; 310/67 R; 310/89; 310/90
(58) Field of Classification Search ............. 310/61–62, 310/67 R, 89–91, 216
See application file for complete search history.

(56) References Cited

U.S. PATENT DOCUMENTS

| 4,647,803 | A | 3/1987 | Von Der Heide |
| 5,436,519 | A | 7/1995 | Takahashi |
| 5,925,948 | A | 7/1999 | Matsumoto |
| 6,023,117 | A | 2/2000 | Chen |
| 6,271,611 | B1 | 8/2001 | Taniguchi |
| 6,400,049 | B1 | 6/2002 | Lai |
| 6,759,772 | B1* | 7/2004 | Chang et al. ............... 310/67 R |
| 6,819,021 | B1* | 11/2004 | Horng et al. .................. 310/91 |
| 6,940,195 | B2* | 9/2005 | Chang et al. .................. 310/91 |
| 7,015,610 | B2* | 3/2006 | Horng et al. .................. 310/90 |
| 7,034,417 | B1* | 4/2006 | Liu .......................... 310/60 A |
| 7,045,919 | B1* | 5/2006 | Lin ........................... 310/67 R |
| 7,091,639 | B2* | 8/2006 | Rojo Lulic ................... 310/90 |
| 7,145,275 | B2* | 12/2006 | Yang et al. ................. 310/90.5 |
| 7,230,357 | B2* | 6/2007 | Rojo Lulic ................... 310/90 |
| 7,300,262 | B2* | 11/2007 | Ku et al. ..................... 417/366 |
| 7,304,446 | B2* | 12/2007 | Wang et al. ............... 318/254.1 |
| 2002/0109426 | A1 | 8/2002 | Peter |

(Continued)

FOREIGN PATENT DOCUMENTS

DE 103 14 894 10/2004

(Continued)

*Primary Examiner*—Thanh Lam
(74) *Attorney, Agent, or Firm*—Antonelli, Terry, Stout & Kraus, LLP.

(57) ABSTRACT

An axial fan motor comprising: a fan having a rotating shaft and composed of a hub and a plurality of vanes provided around the hub, the fan rotating to generate an air flow; a stator substrate set comprising a stator core, which drives the fan, an insulator, and a substrate; and a venturi having a sleeve, into an inner peripheral side of which a bearing is inserted to support the rotating shaft and to an outer peripheral side of which the stator core is fixed, the venturi being formed on one side thereof with an air suction opening and on the other side thereof with an air discharge mouth, wherein a space is provided between the stator core and the sleeve.

11 Claims, 14 Drawing Sheets

U.S. PATENT DOCUMENTS

2004/0075356 A1    4/2004  Horng
2006/0181163 A1*   8/2006  Lee .............................. 310/62
2007/0114857 A1*   5/2007  Liu .............................. 310/58

FOREIGN PATENT DOCUMENTS

| | | |
|---|---|---|
| JP | 07-213005 | 8/1995 |
| JP | 10-159792 | 6/1998 |
| JP | 2003-269381 | 9/2003 |
| JP | 2003-286997 | 10/2003 |
| JP | 2004-332674 | 11/2004 |
| JP | 2005-307793 | 11/2005 |

* cited by examiner

AXIAL FAN MOTOR

BACKGROUND OF THE INVENTION

The present invention relates to an axial fan motor.

An axial fan motor for cooling of heat generating electronic parts is generally mounted on household electric appliance and various OA/IT equipments, but recently, demand of large air flow capacity of the axial fan has been increased because of increase in heat generating amount and reduction in product cost in these household electric appliance and various OA/IT equipments. When an axial fan motor is increased in the air flow capacity, however, there is a tendency that noise due to an electromagnetic exciting force and rotation of vanes is increased. Further, a demand for noise reduction has been increased by pursuit of a comfort environment, and arts corresponding thereto have been developed.

In JP-A-10-159792, vibration reduction is intended by providing vibration isolation rubber between a motor shaft and a fan boss.

In JP-A-2003-269381, vibration reduction is intended by providing vibration isolation rubber between an inner ring member fitted onto a motor shaft and an outer ring member fitted into a fan boss.

In JP-A-2003-286997, vibration reduction is intended by providing vibration isolation rubber between a fan shaft and a fan body.

In JP-A-07-213005, vibration reduction of a fan motor is intended with the use of an attenuation material.

In all of the above-described Patent Documents 1 to 4, a vibration attenuation material such as vibration isolation rubber, etc. is mounted in order to realize vibration reduction, but they cannot be said to be fundamental measures since a vibration source and the vibration isolation rubber are in contact with each other.

Meanwhile, it is desirable that a stator core and a sleeve, which supports the stator core, be separated from each other as far as possible for the sake of vibration reduction and noise reduction, and it is preferred that a contact area between the stator core and the sleeve be made small at the time of supporting. Besides, in these days, in which recycling of a resource is advocated, a product, which affords disassembly and recycling, is desired for axial fan motors.

A stator core and a sleeve, which supports the stator core, in conventional fan motors and blowers are joined together by measures such as bonding, caulking, welding, etc. but when a stator core is fixed to a sleeve by such measures, disassembly cannot be made unless the sleeve is broken, so that recycling of a resource cannot be achieved.

SUMMARY OF THE INVENTION

It is an object of the present invention to provide an axial fan motor of low noise capable of reducing a structure born noise generated by vibrations of the motor, etc. and further even in a state that the axial fan motor is incorporated into various devices.

The above-described object is achieved by an axial fan motor comprising a fan having a rotating shaft and composed of a hub and a plurality of vanes provided around the hub, the fan rotating to generate an air flow, a stator substrate set comprising a stator core, which drives the fan, an insulator, and a substrate, and a venturi having a sleeve, into an inner peripheral side of which a bearing is inserted to support the rotating shaft and to an outer peripheral side of which the stator core is fixed, the venturi being formed on one side thereof with an air suction opening and on the other side thereof with an air discharge mouth, and wherein a space is provided between the stator core and the sleeve.

Also, the above-described object is achieved by an axial fan motor comprising a fan having a rotating shaft and rotating to thereby generate an air flow, a stator substrate set comprising a stator core, which drives the fan, an insulator, and a substrate, and a venturi having a sleeve, into an inner peripheral side of which a bearing is inserted to support the rotating shaft and to an outer peripheral side of which the stator core is fixed, and wherein one or more stoppers provided on an upper portion of the sleeve positioned centrally of the venturi, the stator substrate set provided with a notch or notches, which can pass through the stopper or stoppers, and a spring, which supports the stator substrate set, are provided on a lowermost portion of the sleeve of the venturi, and the stator substrate set is mounted from above the sleeve to bring the insulator into contact with an underside of the stopper or stoppers.

Also, in the invention, the spring passes through the sleeve, the stator core and the substrate are fitted onto the sleeve, and the insulator is rotated and mounted to come into contact with the underside of the stopper or stoppers.

Also, in the invention, a washer is mounted between the insulator and the underside of the stopper or stoppers.

Also, in the above invention, a space is provided above the insulator and sized to correspond to the stopper or stoppers, the space serving to prevent rotation of the stator substrate set.

Also, in the invention, the insulator is provided with a member for prevention of inclination.

Also, in the invention, a recess is provided above the insulator, an insulator is mounted to support a bearing having a shape fitted into the recess, and the bearing is put on the insulator.

Also, in the invention, Lap>0 where Lap indicates a distance in an axial direction between an end surface of an inner cylindrical portion of the venturi on a discharge side and a tip end of the fan.

Also, in the invention, the vane is mounted to meet $\Delta\theta>0$ where $\Delta\theta$ indicates an angle formed between a straight line connecting between a point of intersection of a leading edge of the vane and a boundary of the hub and the vane, and a center of rotation of the fan, and a straight line T connecting between a point of intersection of a trailing edge of the vane and a tip of the vane, and a center of rotation of an impeller, and a direction of rotation is defined to be positive.

According to the invention, it is possible to provide an axial fan motor that reduces a structure born noise generated by vibrations of the motor, etc. and further even in a state that the axial fan motor is incorporated into various devices.

Other objects, features and advantages of the invention will become apparent from the following description of the embodiments of the invention taken in conjunction with the accompanying drawings.

DESCRIPTION OF THE INVENTION

Figure 1:
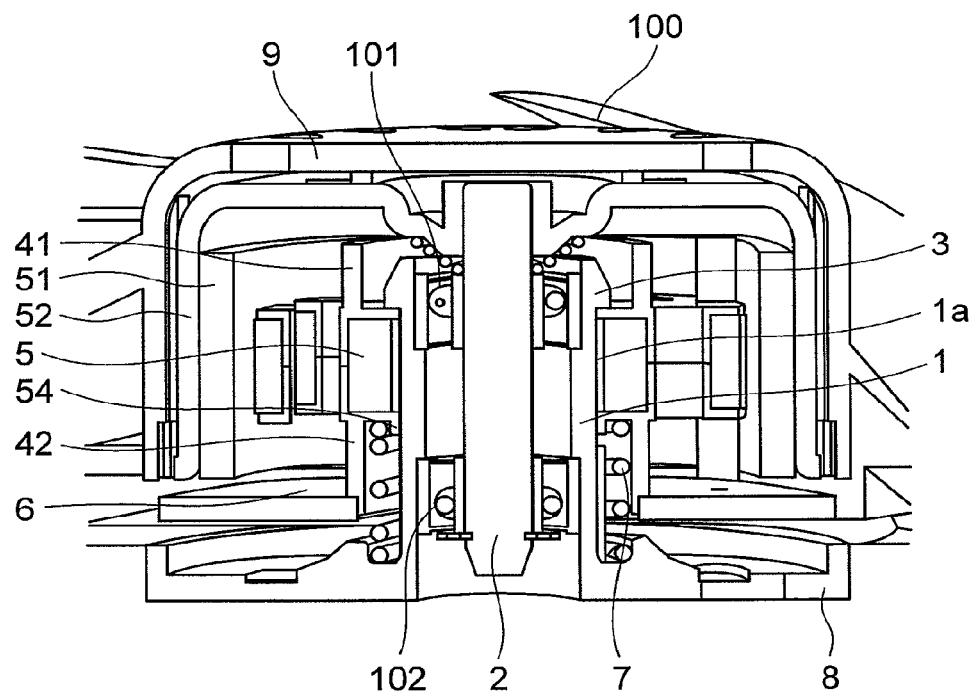
FIG. 1 is a cross sectional view of an axial fan motor according to a first embodiment of the invention.

First, a first embodiment of the invention will be described with reference to FIGS. 1 to 9. In addition, the same reference numerals in the respective figures denote the same parts.

Figure 2:
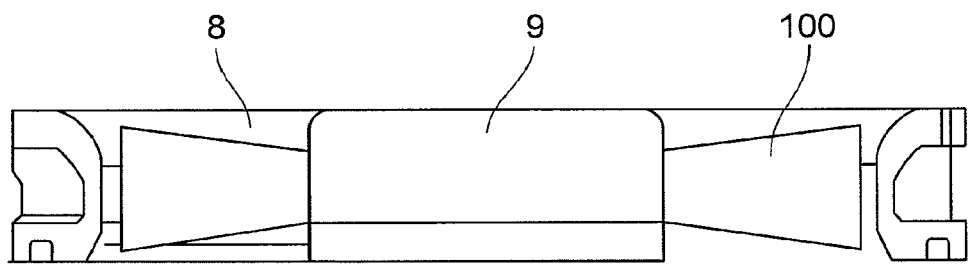
FIG. 2 is a view showing a whole construction of the axial fan motor according to the first embodiment of the invention.

FIG. 1 is a cross sectional view showing an axial fan motor according to a first embodiment of the invention. FIG. 2 is a view showing a whole construction of the axial fan motor according to the first embodiment of the invention. In FIGS. 1 and 2, the reference numeral 1 denotes a sleeve, through which a shaft 2 being a rotating shaft of the axial fan motor extends. The reference numeral 3 denotes stoppers mounted to a tip end of the sleeve 1. The shaft 2 and the sleeve 1 are mounted with bearings 101, 102 therebetween. The reference numeral 41 denotes an upper insulator and 42 a lower insulator. The reference numeral 5 denotes a stator core and a fan, to which a rotor comprising a magnet 51 and a rotor case 52 is mounted, is mounted to an outer periphery opposed to the stator core 5. This is a so-called outer rotor type motor. The reference numeral 6 denotes a substrate with electronic parts mounted thereon. A stator substrate set is formed by the insulators 41, 42, the stator core 5, and the substrate 6 among the respective parts, and a motor part is formed by the stator substrate set and the rotor. The reference numeral 8 denotes a venturi provided with a clearance defined between it and a tip end of the fan, and a spring 7 is mounted between the substrate 6 and the venturi 8. In FIG. 1, the reference numeral 9 denotes a hub of the fan 100, and 54 a stop for prevention of inclination. Also, a space 1a is defined between the stator core 5 and the sleeve 1.

In FIG. 2, the reference numeral 9 denotes the hub of the fan and the rotor described above is mounted in the hub 9. While the motor part comprises the stator substrate set and the rotor, low vibration and low noise of the whole fan can be realized provided that vibration from the stator core 5 of the motor part being a source of vibration can be suppressed from the viewpoint of vibration reduction and noise reduction of the fan motor. Also, in FIG. 2, the reference numeral 8 denotes the venturi and 100 the fan.

Figure 3:
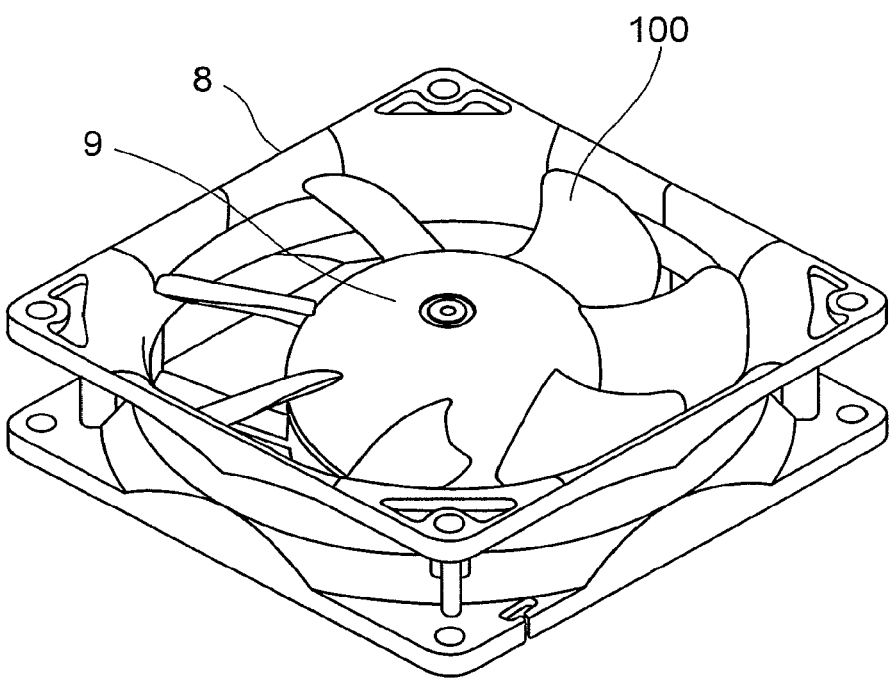
FIG. 3 is a perspective view of the axial fan motor according to the first embodiment of the invention.

FIG. 3 is a perspective view showing the axial fan motor. FIG. 3 is a configuration shown in FIG. 1 as viewed obliquely. That is, as shown in FIG. 1, four stoppers 2 are equiangularly mounted to the tip end of the sleeve 1, which is mounted integral with the venturi 8, and the stator substrate set comprising the insulators 41, 42, the stator core 5, and the substrate 6 is fitted onto the sleeve 1 in a manner to pass by the stoppers 3. The stator substrate set is rotated and fixed in order to shift positions of notches (not shown), through which the stoppers 3 pass after fitting. The hub 9 of the fan 100 shown in FIG. 2 is mounted so as to cover the stator substrate set as fixed, whereby a so-called outer rotor type axial fan motor is formed as shown in FIG. 3.

Figure 4:
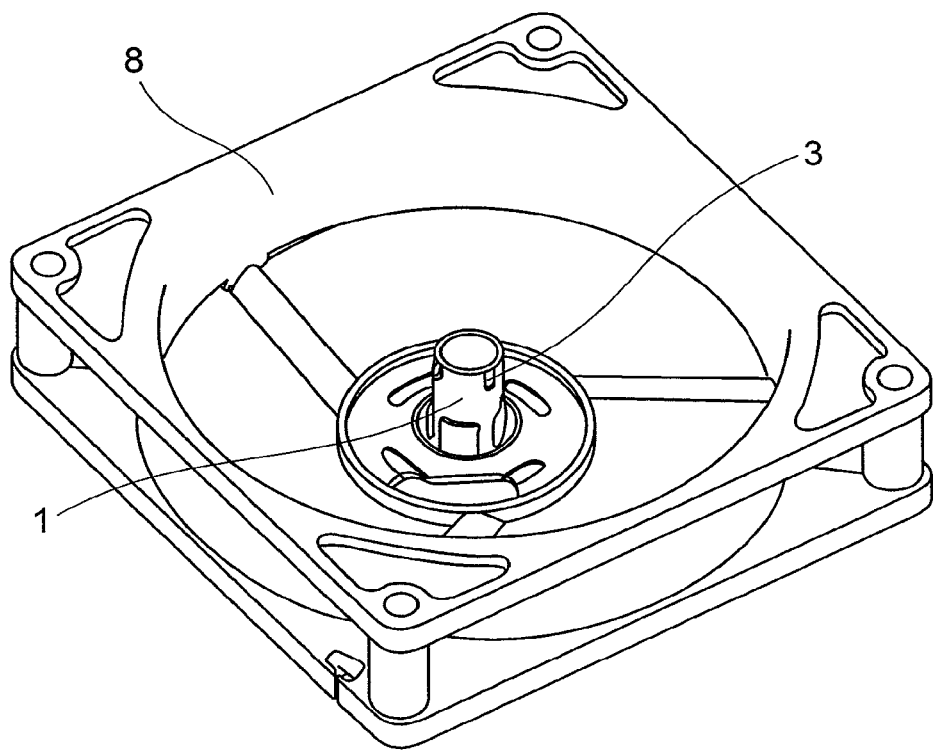
FIG. 4 is a perspective view of a venturi of the axial fan motor according to the first embodiment of the invention.

Constituent portions of the axial fan motor shown in FIGS. 1 and 3 will be described with reference to FIGS. 4 to 8. FIG. 4 is a perspective view of the venturi. In FIG. 4, the sleeve 1 mounted to a central portion of a bottom surface of the venturi 8 is cylindrical-shaped and four stoppers 3 according to the embodiment are mounted to an upper portion of the sleeve 1 in cross directions. While the four stoppers 3 according to the embodiment are mounted to the tip end of the sleeve 1, the number of stoppers is not necessarily required to be four but it suffices that the number of stoppers is at least three or more.

Figure 5:
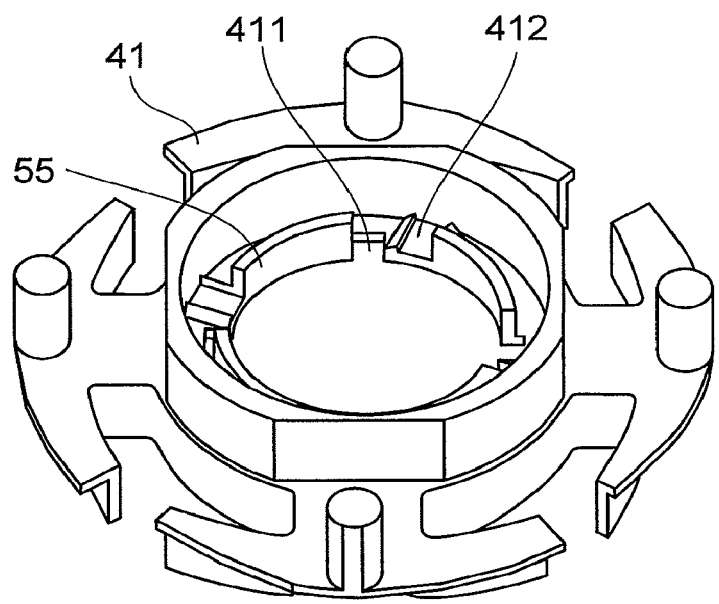
FIG. 5 is a perspective view of an upper insulator of the axial fan motor according to the first embodiment of the invention.

FIG. 5 is a perspective view of the upper insulator 41. In FIG. 5, the upper insulator 41 includes notches 411, through which the stoppers 3 (shown in FIG. 4) on the upper portion of the sleeve 1 pass, stopper supports 412, to which the stoppers 3 are finally fixed, and a wall 55 for prevention of inclination of the stator substrate set.

Figure 6:
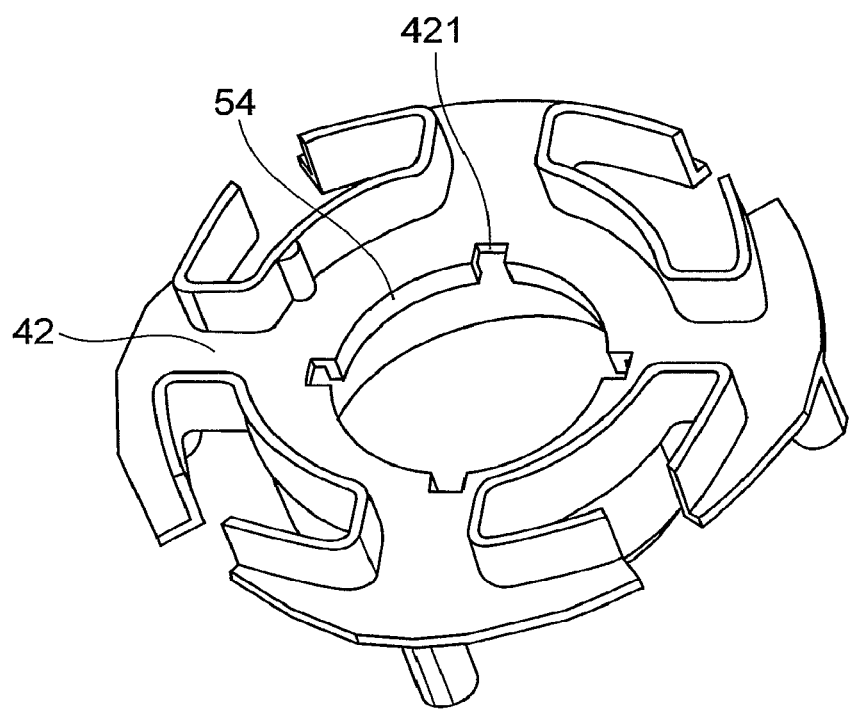
FIG. 6 is a perspective view of a lower insulator of the axial fan motor according to the first embodiment of the invention.

FIG. 6 is a perspective view of the lower insulator 42. In FIG. 6, the lower insulator 42 is provided with, in the same manner as the upper insulator 41 shown in FIG. 5, notches 421 for passage therethrough of the stoppers 3 (shown in FIG. 4), and a wall 54 for prevention of inclination of the stator substrate set.

Figure 7:
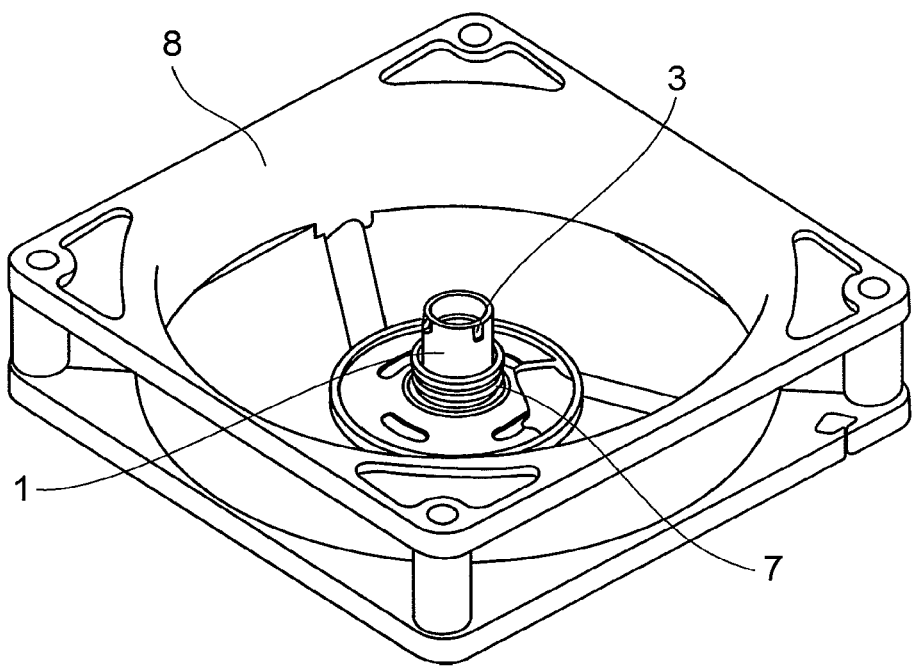
FIG. 7 is a perspective view showing a state when a spring is fitted onto a sleeve of the axial fan motor according to the first embodiment of the invention.
Figure 8:
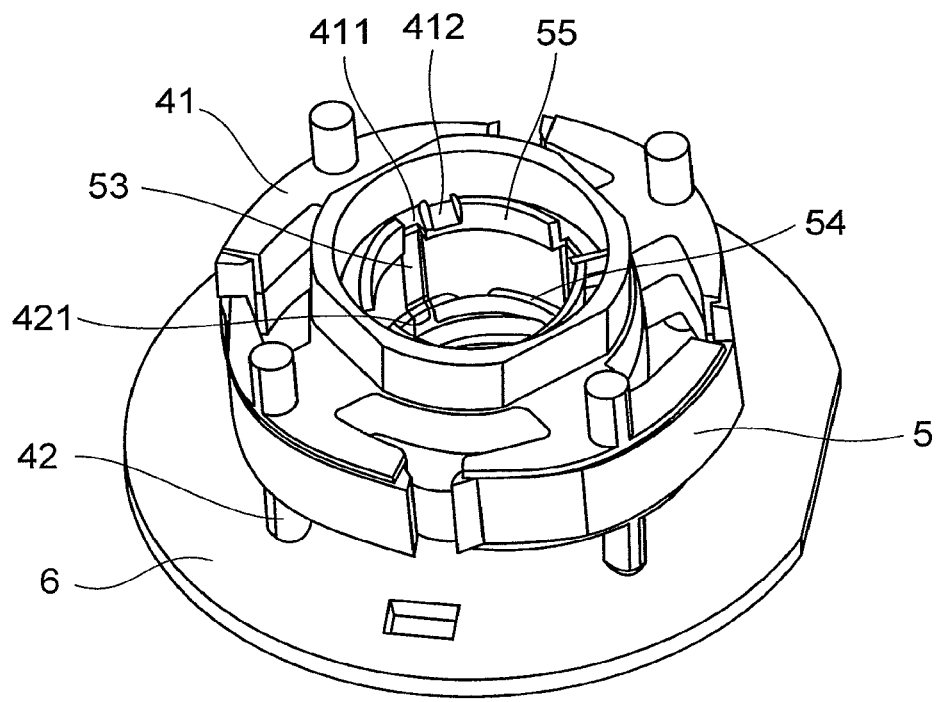
FIG. 8 is a perspective view of a stator substrate set of the axial fan motor according to the first embodiment of the invention.

FIG. 7 is a perspective view showing a state when the spring 7 is fitted onto the sleeve 1 and FIG. 8 is a perspective view of the stator substrate set, in which the insulator 4 (the upper insulator 41 and the lower insulator 42), the stator core 5, and the substrate 6 are combined together. As shown in FIG. 8, notches 53, 411, 421 are provided on inner sides of upper portions of the stator core 5 and the insulators 41, 42 to enable four stoppers 3 to pass therethrough when fitted onto the sleeve 1.

Subsequently, the procedure of assembly will be described with reference to the drawings. First, the spring 7 is fitted onto the sleeve 1 of the venturi 8 as shown in FIG. 7. Subsequently, the stator substrate set shown in FIG. 8 is fitted onto the sleeve 1 mounted to a central portion of the venturi 8. At this time, the four stoppers 3 of the sleeve 1 are inserted in a manner to pass through the notches 53, 411, 421 formed on the inner sides of the upper portions of the stator core 5 and the insulators 41, 42. Stated conversely, the stator substrate set is fitted so that the stoppers 3 pass through the notches 53, 411, 421 inside. Here, the respective notches 53, 411, 421 inside the stator substrate set are sized to enable passage of the stoppers 2 therethrough.

After the stator substrate set is fitted, the stator substrate set and the sleeve 1 are fixed together by pushing the fitted stator substrate set toward a bottom portion of the venturi 8 and rotating the stator substrate set itself. Specifically, the stator substrate set is rotated until the stoppers 2 having passed through the notches 411 of the upper insulator 41 shown in FIG. 5 come to positions about the stopper supports 412 and fixed. In addition, since the stator substrate set is rotated in the same direction as a direction (counterclockwise in the embodiment) of rotation of the fan and is fixed, it will not rotate in a reverse direction to that at the time of mounting to come off even in the case where the fan is mounted and operated. That is, since a force acts on the stator substrate set in the direction of rotation of the fan but a force does not act thereon in a reverse direction, the stator substrate set will not come off. In view of safety, however, the stopper supports 412 are downwardly concave in shape to allow the stoppers 3 to be fitted therein, thus preventing the stoppers from coming off. Also, the stopper supports 412 have a function of positioning the stator substrate set. Also, since the walls 54, 55 for prevention of inclination are provided in order to maintain levelness of the stator substrate set, it is possible to suppress time fluctuation of rotating speed also when the fan 100 rotates and stable air volume can be supplied.

In addition, while the stator substrate set is rotated and fixed in the embodiment, a washer may be used between an upper surface of the upper insulator 41 and lower surfaces of the stoppers 3. At this time, the washer needs notches sized to enable the stoppers 3 to pass therethrough, and notches, to which the stoppers 3 are fixed.

Here, since the space 1a shown in FIG. 1 is provided between the stator core 5 and the sleeve 1, the space 1a prevents vibrations of the stator core 5 from being transmitted directly to the sleeve. Also, vibrations transmitted directly to a root of the sleeve 1 from the substrate 6 are also attenuated by the spring 7.

Figure 9:
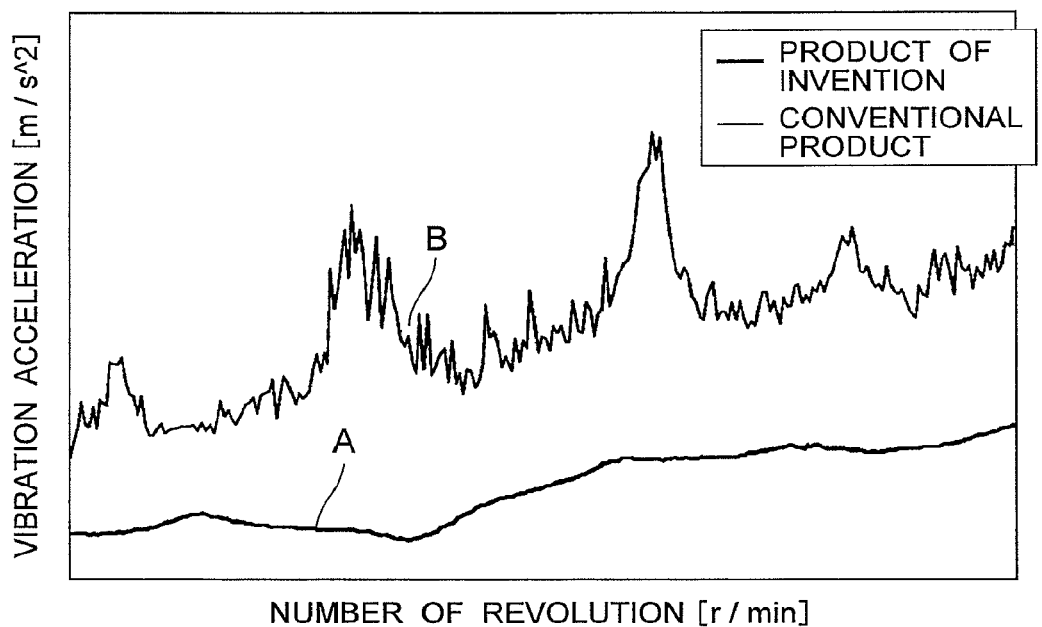
FIG. 9 is a view illustrating a comparison in vibration between the first embodiment of the invention and a conventional product.

Vibrations generated in the fan motor according to the embodiment and a conventional fan motor will be described with reference to FIG. 9. Vibrations in the vicinity of the root of the sleeve 1 of the venturi 8 were measured. In addition, the respective parts such as the venturi 8, the insulators 41, 42, the fan 100, etc. are the same in physical property values. As shown in the FIG. 9, it is found that the fan motor (a thick, solid line A) according to the embodiment becomes ½ or less in vibration acceleration as compared with the conventional fan motor (a thin, solid line B).

As described above, according to the embodiment, the stator core is not fixed by means of an adhesive, welding, caulking, etc., and therefore, assembling and disassembling of the fan can be readily made. Also, the stator core is structured not in directly contact with the sleeve, and therefore, it is possible to decrease vibrations of the stator core, and an axial fan motor of low vibration and low noise can be provided.

Next, a second embodiment of the invention will be described with reference to FIG. 10 to 13. In addition, the same reference numerals in the respective drawings denote the same parts.

Figure 10:
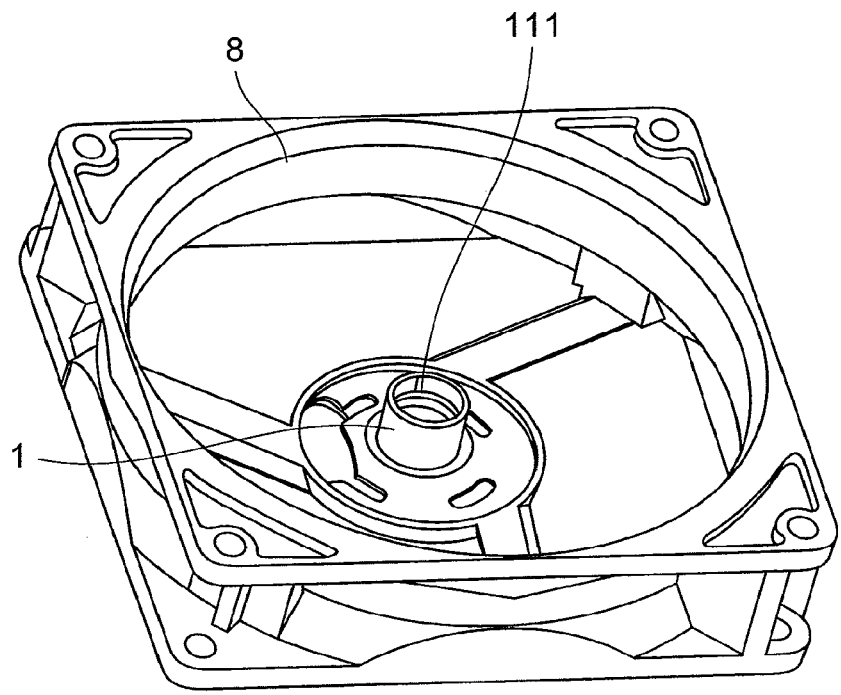
FIG. 10 is a perspective view of a venturi of an axial fan motor according to a second embodiment of the invention.

FIG. 10 is a perspective view of a venturi. As shown in FIG. 10, an upper end of a sleeve 1 mounted to a central portion of the venturi 8 is circular-shaped and downwardly concave-shaped and is provided on a part of a circumference thereof with a notch 111 for positioning. An upper insulator described later is fitted into the circular-shaped recess.

Figure 11:
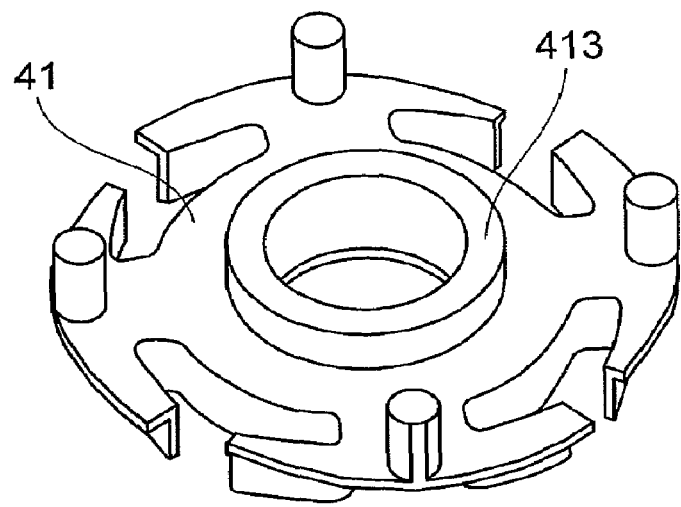
FIG. 11 is a perspective view of an upper insulator of the axial fan motor according to the second embodiment of the invention.

FIG. 11 is a perspective view of the upper insulator 41. The upper insulator 41 is provided with a bearing support 413. A bearing is fitted inside the bearing support 413.

Figure 12:
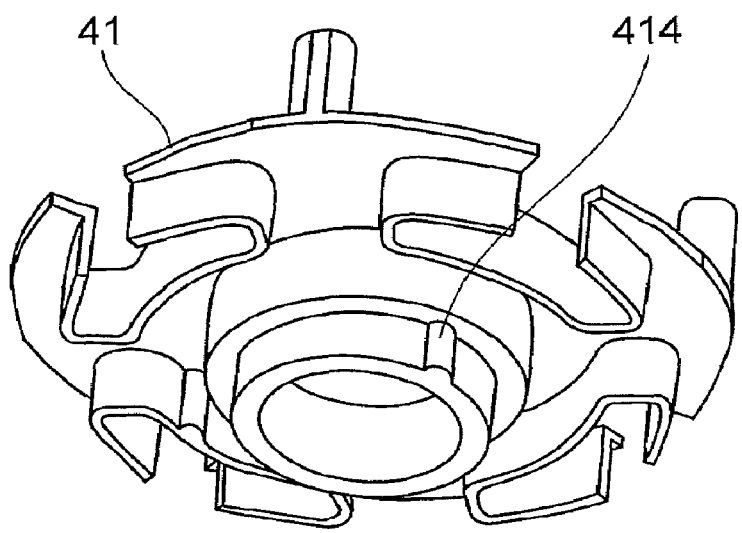
FIG. 12 is a perspective view of the upper insulator of the axial fan motor, according to the second embodiment of the invention, as viewed from under.

FIG. 12 is a perspective view of the upper insulator 41 as viewed from under. As shown in FIG. 12, a projection 414 for positioning is mounted to an underside of the upper insulator 41 to be fitted into the notch 111 on the upper portion of the sleeve shown in FIG. 10.

Figure 13:
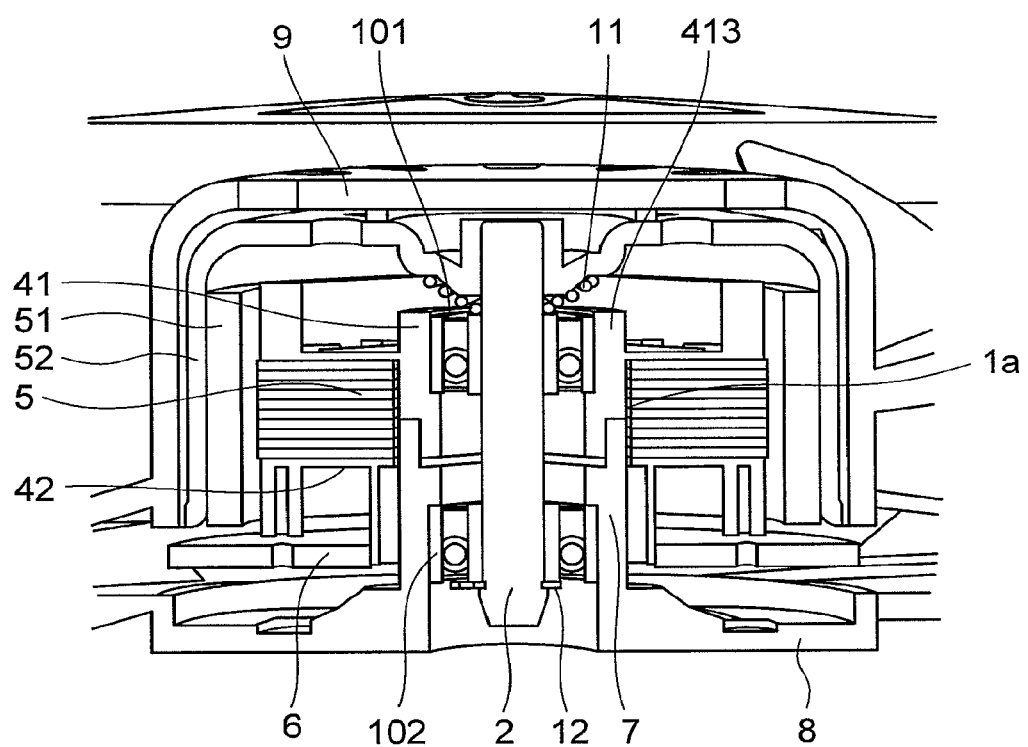
FIG. 13 is a cross sectional view of the axial fan motor according to the second embodiment of the invention.

FIG. 13 is a cross sectional view of a motor part of a fan motor, in which the embodiment is employed. The procedure of assembling will be described with reference to FIG. 13.

First, a stator substrate set is formed by the upper insulator 41, a stator core 5, a lower insulator 42, and a substrate 6, and fitted onto the sleeve 1 centrally of the venturi 8. At this time, the projection 414 of the upper insulator 41 shown in FIG. 12 is assembled to the notch 111 on the upper portion of the sleeve 1 shown in FIG. 10 so as to be fitted thereinto. In addition, a fan, to which a rotor comprising a magnet 51 and a rotor case 52 is mounted, is mounted to an outer periphery opposed to the stator core 5.

Subsequently, the bearing 101 is put on the bearing support 413 of the upper insulator 41 and the shaft 2 of the hub 9 of the fan is inserted into the bearing 101 with a conical spring 11 therebetween. Finally, the bearing 102 is mounted in the lower portion of the sleeve 1 and retained by a retaining ring 12.

With such construction, a space 1a is provided between the stator core 5 and the sleeve 1, and therefore, the space 1a prevents vibrations of the stator core 5 from being transmitted directly to the sleeve. Also, the upper insulator 41, which holds the bearing 101, and the sleeve, which holds the lower bearing 102, are separate from each other and not completely joined structurally, that is, an area for transmission of vibrations is decreased as compared with the case where they are formed integrally by the same member, and therefore, vibrations generated by the fan can also be reduced.

Also, the sleeve 1 and the stator substrate set are interposed between the upper and lower bearings 101, 102 and joined by the shaft 2 and the retaining ring 12, and therefore, it is unnecessary to adopt measures such as bonding with an adhesive, welding, so that assembling and disassembling are readily made and recycling is excellent.

Subsequently, a third embodiment of the invention will be described with reference to FIG. 14 to 18. In addition, the same reference numerals in the respective drawings denote the same parts.

Figure 14:
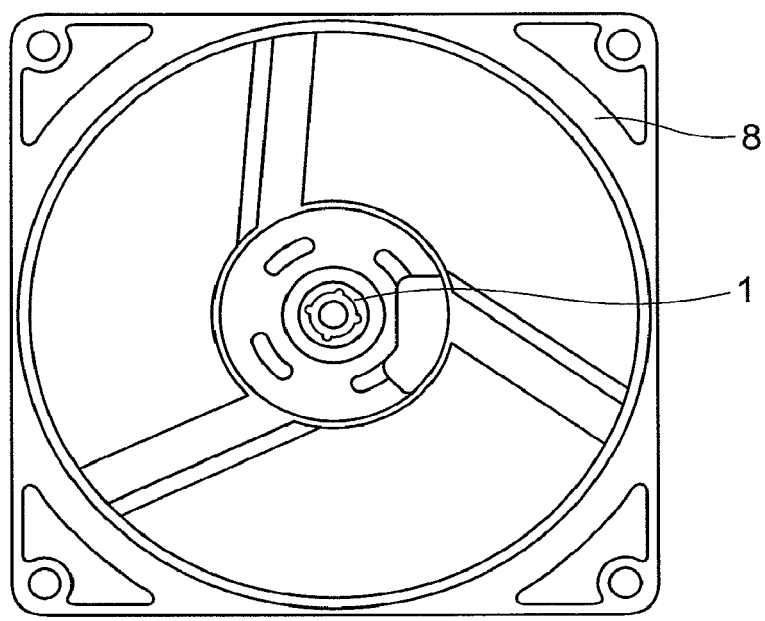
FIG. 14 is a perspective view of a venturi of an axial fan motor according to a third embodiment of the invention.
Figure 15:
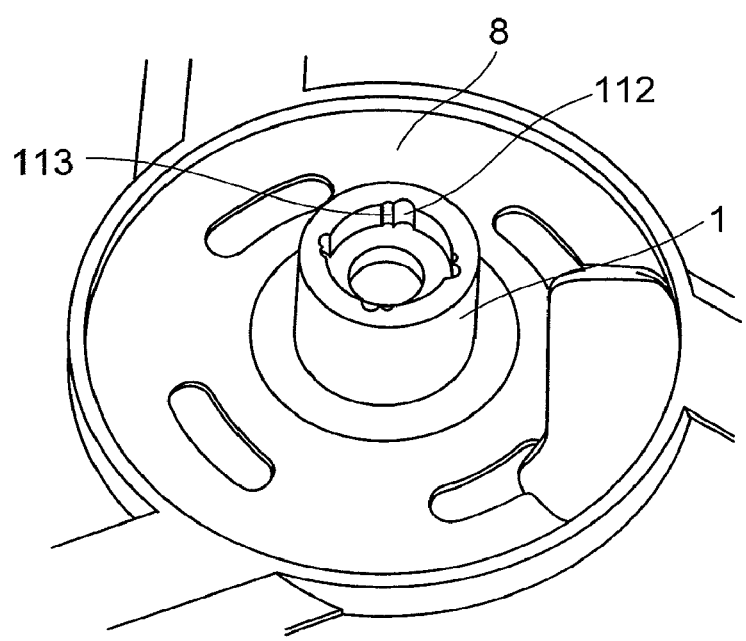
FIG. 15 is an enlarged, perspective view showing the vicinity of a sleeve of the axial fan motor according to the third embodiment of the invention.

FIG. 14 is a perspective view of a venturi. As shown in FIG. 14, an upper end of a sleeve 1 mounted to a central portion of the venturi 8 is circular-shaped and downwardly concave-shaped to include large and small, semi-circular notches in eight locations on a circumference thereof. The notches will be described with reference to an enlarged, perspective view of FIG. 15, which shows the vicinity of the sleeve 1. As shown in FIG. 15, two kinds of semi-circular notches, that is, notches 112 for passage and notches 113 for positioning are provided and the notches 113 for positioning have a small radius as compared with the notches 112 for passage. Two of these notches constitute a set and are arranged very close to each other, four sets in total being arranged in cross directions, that is, every 90 degrees.

Figure 16:
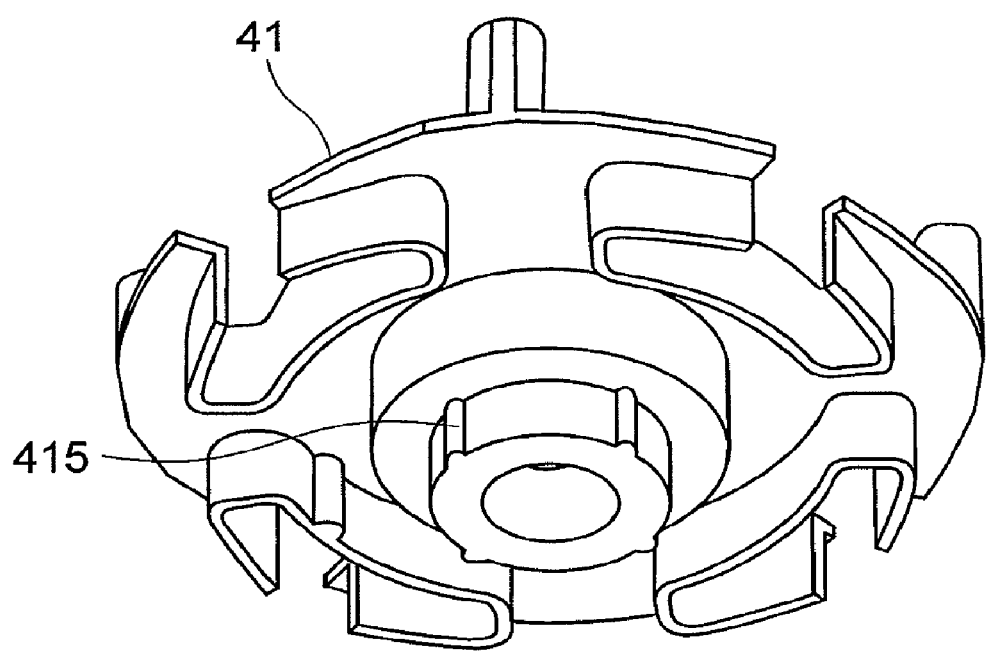
FIG. 16 is a perspective view showing an upper insulator of the axial fan motor, according to the third embodiment of the invention, as viewed from under.

FIG. 16 is a perspective view of the upper insulator 41 as viewed from under. As shown in FIG. 16, projections 415 for positioning are mounted to an underside of the upper insulator 41. The upper insulator 41 is fitted into an upper portion of the sleeve 1 shown in FIG. 15.

Figure 17:
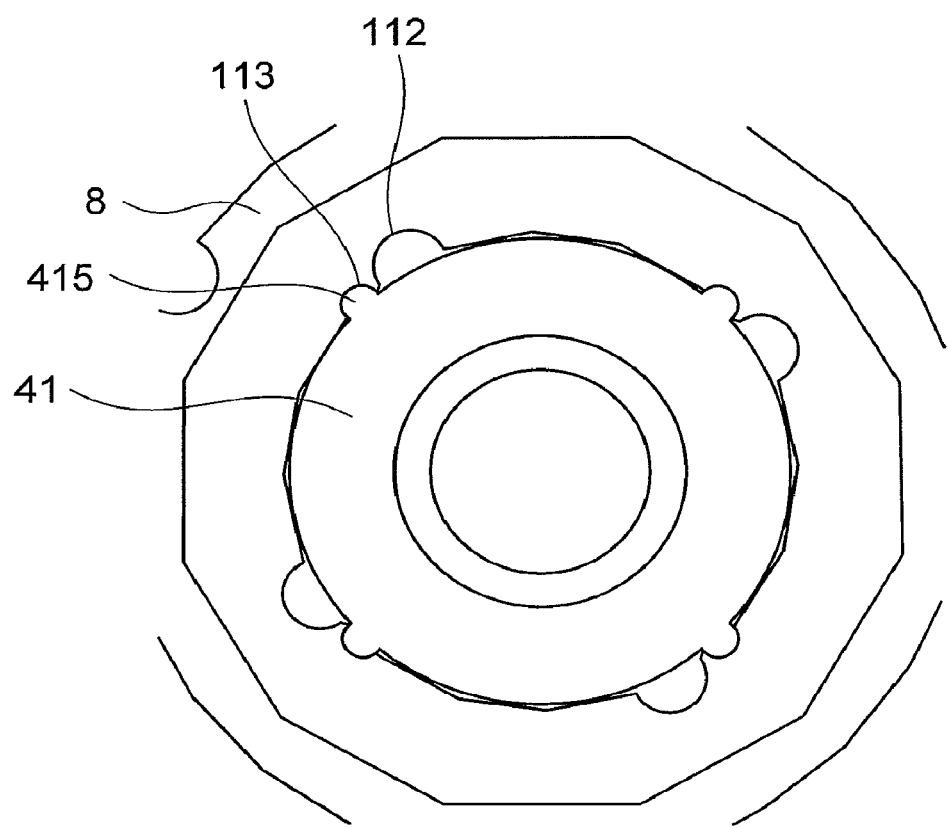
FIG. 17 is a view showing a manner, in which the insulator and the sleeve according to the third embodiment of the invention are joined.

FIG. 17 is a view showing a manner, in which the insulator 41 and the sleeve 1 are joined. As shown in FIG. 17, the projections 415 for positioning, on the upper insulator 41 are first inserted into the notches 112 for passage on the sleeve 1 and in a stage, in which all the projections 415 have entered, the upper insulator 41 is then rotated counter-clockwise and the projections 415 are fitted into and fixed to the notches 113 for positioning, on the sleeve 1.

Figure 18:
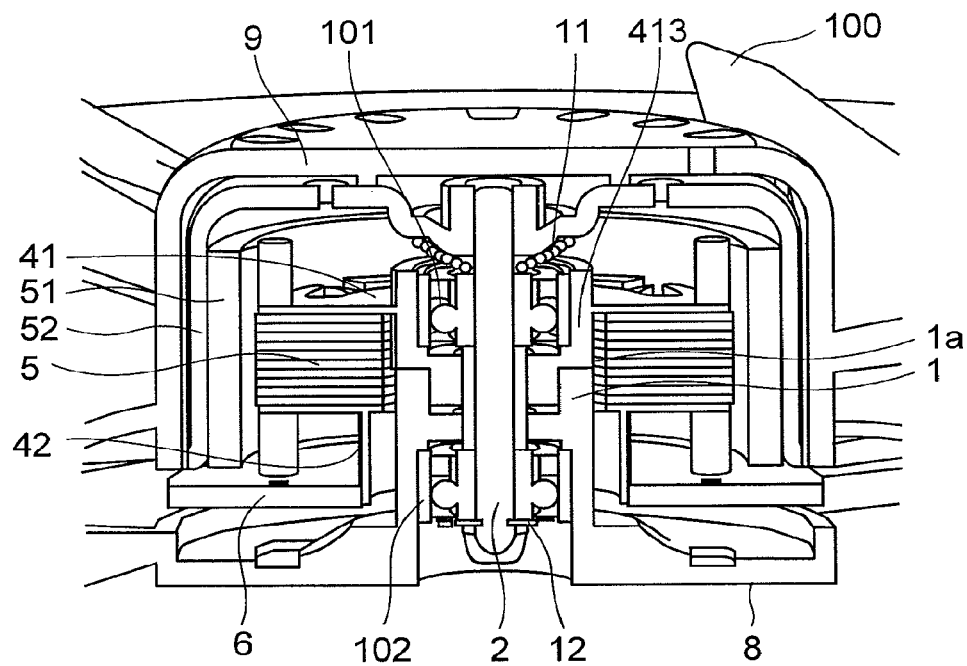
FIG. 18 is a cross sectional view of the axial fan motor according to the third embodiment of the invention.

FIG. 18 is a cross sectional view of a motor part of a fan motor, in which the embodiment is employed. The procedure of assembling will be described with reference to FIG. 18.

First, a stator substrate set is formed by the upper insulator 41, the stator core 5, the lower insulator 42, and the substrate 6, and inserted into the sleeve 1 on a central portion of the venturi 8. At this time, assembling is made so that the projections 415 of the upper insulator 41 shown in FIG. 16 are fitted into the notches 112 for passage, on the upper portion of the sleeve 1. In addition, a fan, to which a rotor comprising a magnet 51 and a rotor case 52 is mounted, is mounted to an outer periphery opposed to the stator core 5.

Subsequently, as described with reference to FIG. 17, the stator substrate set is rotated counterclockwise and the projections 415 are fitted into and fixed to the notches 113 for positioning, on the sleeve 1. Since the stator substrate set is rotated in the same direction as a direction (counterclockwise in the embodiment) of rotation of the fan and is fixed, it will not rotate in a reverse direction to that at the time of mounting to come off even in the case where the fan is mounted and operated. That is, since a force acts on the stator substrate set in the direction of rotation of the fan but a force does not act thereon in a reverse direction, the stator substrate set will not come off. Subsequently, the bearing 101 is put on the bearing support 413 of the upper insulator 41 and the shaft 2 of the hub 9 of the fan is inserted into the bearing 101 with a conical spring 11 therebetween. Finally, the bearing 102 is mounted in the lower portion of the sleeve 1 and retained by the retaining ring 12.

With such construction, since the space 1a is provided between the stator core 5 and the sleeve 1, the space 1a prevents vibrations of the stator core 5 from being transmitted directly to the sleeve. Also, the upper insulator 41, which holds the bearing 101, and the sleeve, which holds the lower bearing 102, are separate from each other and not completely joined structurally, that is, an area for transmission of vibrations is decreased as compared with the case where they are formed integrally by the same member, and therefore, vibrations generated by the fan can also be reduced.

Also, the sleeve 1 and the stator substrate set are interposed between the upper and lower bearings 101, 102 and joined by the shaft 2 and the retaining ring 12, and therefore, it is unnecessary to adopt measures such as bonding with an adhesive, welding, so that assembling and disassembling are readily made and recycling is excellent.

Subsequently, a fourth embodiment of the invention will be described with reference to FIG. 19 to 22. In addition, the same reference numerals in the respective drawings denote the same parts.

Figure 19:
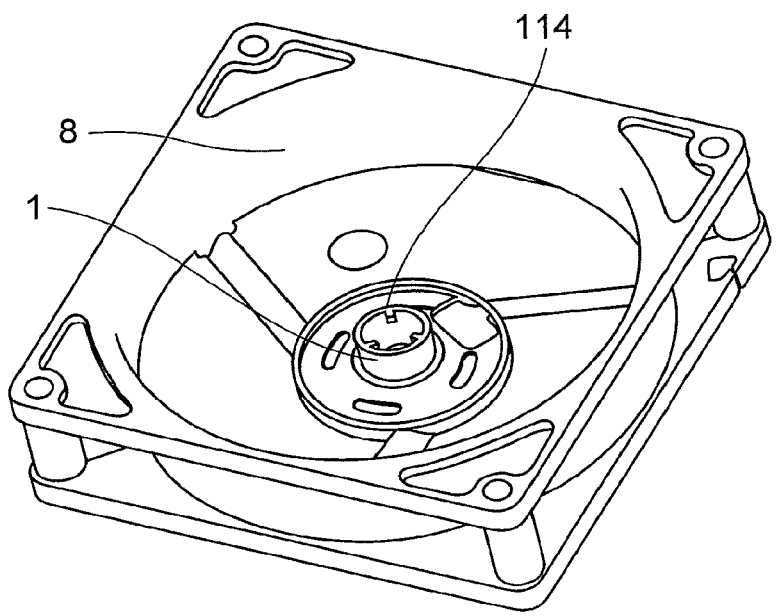
FIG. 19 is a perspective view of a venturi according to a fourth embodiment of the invention.

FIG. 19 is a perspective view of a venturi. As shown in FIG. 19, an upper end of a sleeve 1 mounted to a central portion of the venturi 8 includes projections 114 in three locations.

Figure 20:
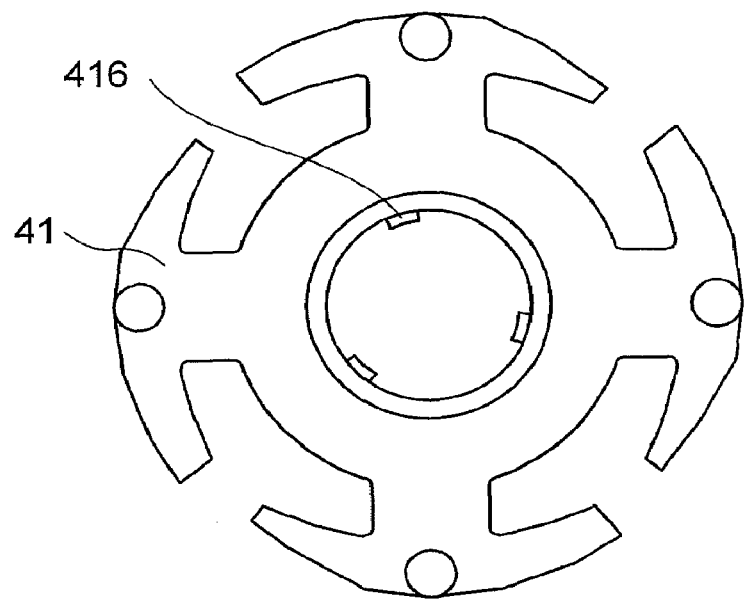
FIG. 20 is a view of the upper insulator, according to the fourth embodiment of the invention, as viewed from above.
Figure 21:
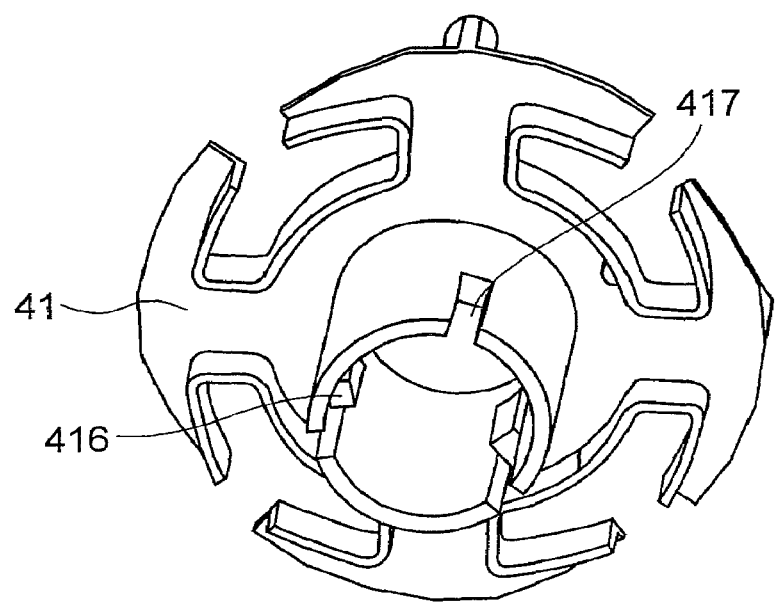
FIG. 21 is a view of the upper insulator, according to the fourth embodiment of the invention, as viewed from under.
Figure 22:
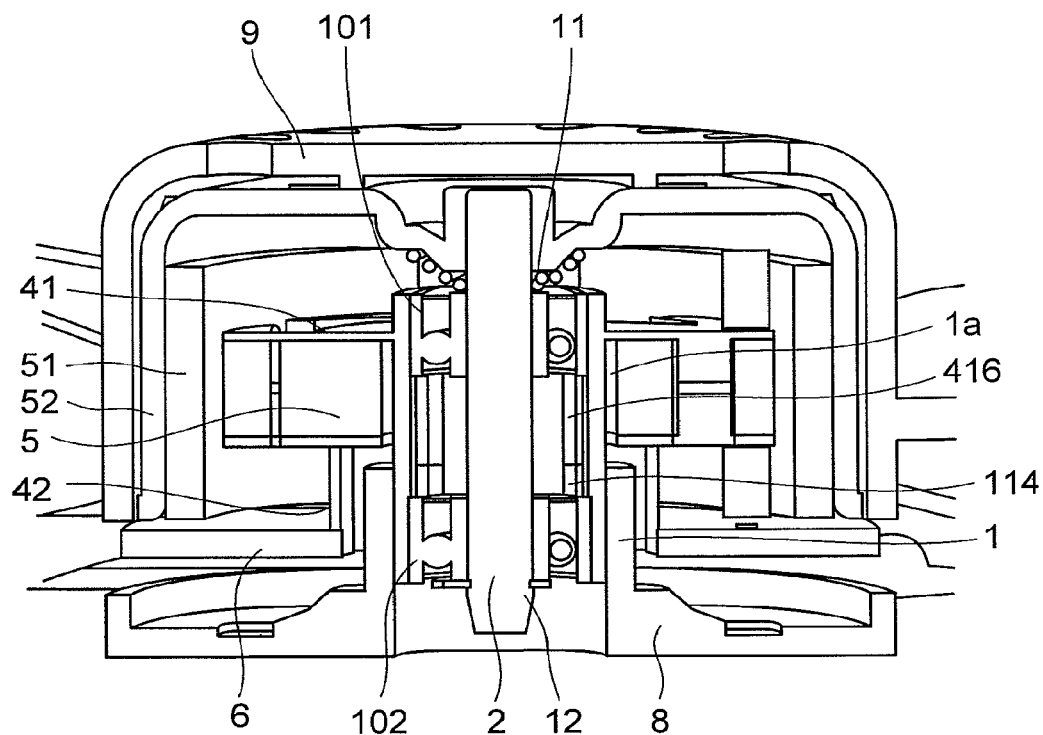
FIG. 22 is a cross sectional view of a fan motor according to the fourth embodiment of the invention.

FIG. 20 is a view of an upper insulator 41 as viewed from above and FIG. 21 is a perspective view of the upper insulator 41 as viewed from under. The upper insulator 41 is provided in three locations with bearing supports 416. Bearings are fitted onto upper sides of the bearing supports 416. Also, as shown in FIG. 22, notches 417 are provided in three locations on a lower portion of the upper insulator to be formed below the bearing supports 416. The projections 114 at the upper end of the sleeve 1 shown in FIG. 19 are fitted into the notches 417.

FIG. 22 is a cross sectional view of a motor part of a fan motor, in which the embodiment is employed. The procedure of assembly will be described with reference to FIG. 22.

First, a stator substrate set is formed by the upper insulator 41, a stator core 5, a lower insulator 42, and a substrate 6, and inserted into the sleeve 1 on a central portion of the venturi 8. At this time, assembling is made so that the projections 114 on the upper portion of the sleeve 1 shown in FIG. 19 are fitted into the notches 417 of the upper insulator 41 shown in FIG. 21. In addition, a fan, to which a rotor comprising a magnet 51 and a rotor case 52 is mounted, is mounted to an outer periphery opposed to the stator core 5.

Subsequently, a bearing 101 is put on the bearing supports 416 of the upper insulator 41 and a shaft 2 of a hub 9 of the fan is inserted into the bearing 101 with a conical spring 11 therebetween. Finally, a bearing 102 is mounted in a lower portion of the sleeve 1 and retained by a retaining ring 12.

With such construction, a space 1a is provided between the stator core 5 and the sleeve 1, and therefore, the space 1a prevents vibrations of the stator core 5 from being transmitted directly to the sleeve. Also, the upper insulator 41, which holds the bearing 101, and the sleeve, which holds the lower bearing 102, are separate from each other and not completely joined structurally, that is, an area for transmission of vibrations is decreased as compared with the case where they are formed integrally by the same member, and therefore, vibrations generated by the fan can also be reduced.

Also, since the sleeve 1 and the stator substrate set are interposed between the upper and lower bearings 101, 102 and joined by the shaft 2 and the retaining ring 12, it is unnecessary to adopt measures such as bonding with an adhesive, welding, so that assembling and disassembling are readily made and recycling is excellent.

Figure 23:
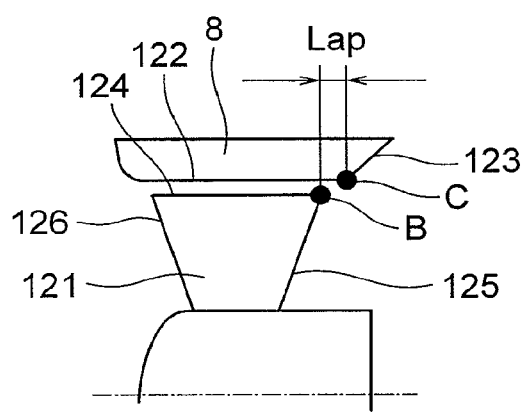
FIG. 23 is a cross sectional view of a meridian plane of a fan according to the fourth embodiment of the invention.

Subsequently, a fifth embodiment of the invention will be described with reference to FIG. 23. FIG. 23 is a cross sectional view of a meridian plane of a fan of an axial fan motor according to the fifth embodiment. The reference numeral 121 denotes one vane of the fan 100 shown in FIG. 3, 122 an inner cylindrical portion of a venturi 8, and C a boundary of the cylindrical portion 122 and an enlarged portion 123. A distance between a point B of intersection of a tip 124 and a trailing edge 125 of a vane 121 and the boundary C is defined as Lap. The trailing edge 125 of the vane does not overlap a side of the enlarged portion 123 and the cylindrical portion 122 covers the whole of the fan 100 such that Lap>0. In addition, the reference numeral 126 denotes a leading edge of the vane 121.

Such construction eliminates interference between a vane tip vortex, which is discharged from a clearance between the tip 124 and the cylindrical portion 122, and the enlarged portion 11. Thereby, it is possible to suppress non-uniformity in flow on a discharge side to reduce noise generated upon rotation of the fan 100. Further, when Lap is made greater than zero, a straight portion of the inner cylindrical portion 122 of the venturi 8 is lengthened, so that the venturi 8 is improved as a whole in stiffness, thus enabling reducing vibrations.

Subsequently, a sixth embodiment of the invention will be described with reference to FIGS. 24 and 25. In addition, the same reference numerals in the respective drawings denote the same parts.

Figure 24:
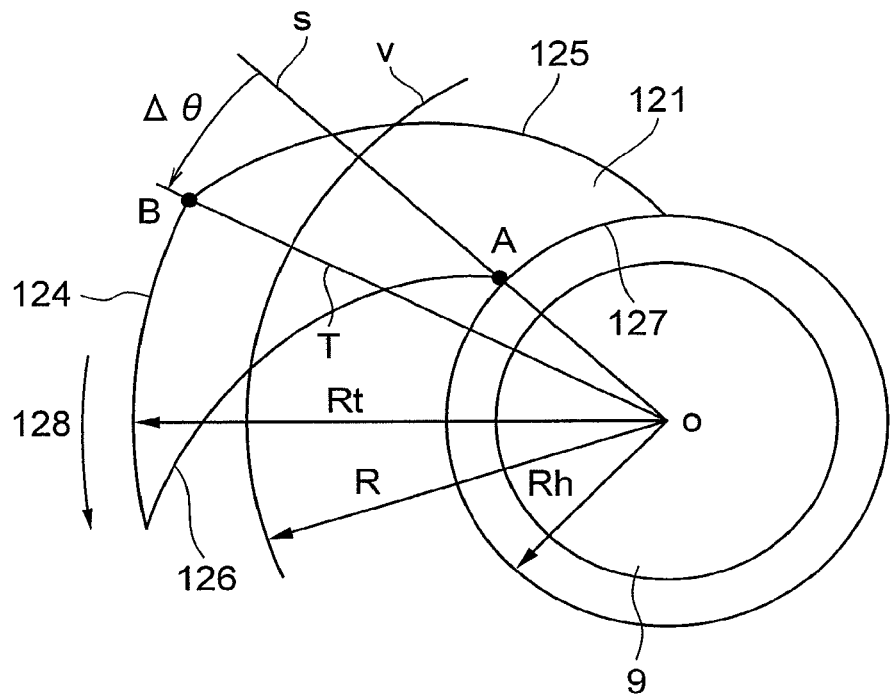
FIG. 24 is a plan view of an impeller of a fan according to a fifth embodiment of the invention as viewed from a suction side.

FIG. 24 is a plan view of a fan of an axial fan motor according to the sixth embodiment as viewed from a suction side. The reference numeral 121 denotes a vane, 9 a hub, 126 a leading edge of the vane, 125 a trailing edge of the vane, 124 a tip of the vane, 127 a boundary of the vane and the hub (referred below to as hub portion), and 128 a direction of rotation of an impeller. A plurality of the vanes 121 are arranged around the hub 9.

"A" indicates a point of intersection of the leading edge 125 and the hub portion 127, "B" a point of intersection of the trailing edge 126 and the tip 124, "S" a straight line connecting between the point A of intersection and a center "O" of rotation of a fan, and "T" a straight line connecting between the point B of intersection and the center O of rotation of the fan. It is determined that $\Delta\theta$ is greater than zero where $\Delta\theta$ indicates an angle formed between the straight line S and the straight line T and a direction 128 of rotation is defined to be positive. In addition, $\Delta\theta$ is about 20 degrees in the embodiment of FIG. 24. In this manner, the fan is shaped such that $\Delta\theta$ is positive, that is, the vanes 121 overhang in the direction of rotation.

Figure 25:
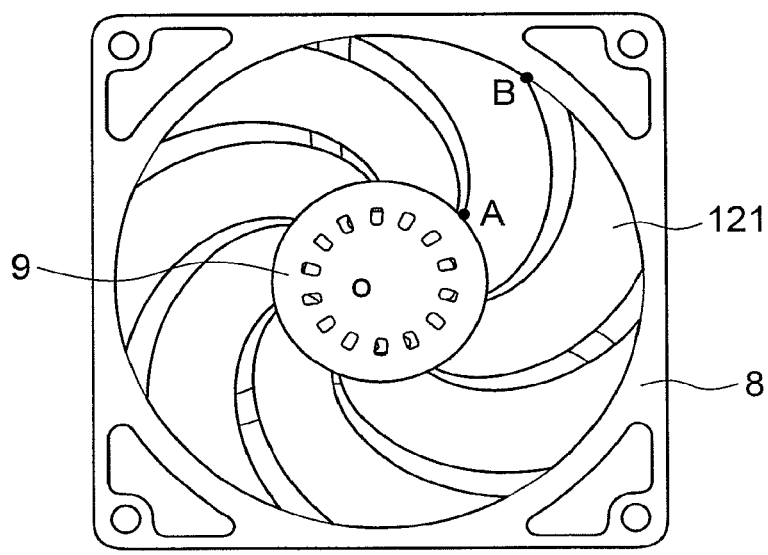
FIG. 25 is a plan view of an axial fan motor according to the fifth embodiment of the invention.

FIG. 25 is an axial fan motor, on which the fan shown in FIG. 24 is mounted. The reference numeral 8 denotes a venturi, 121 a vane and 9 a hub. The stator substrate set according to any one of the first to fourth embodiments is mounted on the venturi 8, and the vanes 121 and the venturi 8 meet the relationship according to the fifth embodiment. Such combination of the fan, the venturi, and the stator substrate set can reduce vibrations by the motor and fluid noise generated from the fan and can achieve an improvement in fluid performance by making the overhang of the vanes 121 large as shown in FIG. 24.

As described above, since the invention is constructed such that the motor stator core and the sleeve do not come into contact directly with each other and vibration of the stator core is attenuated to reach the sleeve, and therefore, it is possible to reduce vibrations of the fan. Owing to such vibration reductions of the fan, OA/IT equipment and household electric appliance, on which the fan is incorporated and mounted, can be made low in vibration and noise. Also, since the stator core and the sleeve are not brought firmly in direct contact with each other by welding, an adhesive material, or the like, disassembling can be readily made. Therefore, recycling of the stator core, the venturi, etc. as disassembled becomes possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An axial fan motor comprising: a fan having a rotating shaft and composed of a hub and a plurality of vanes provided around the hub, the fan rotating to generate an air flow; a stator substrate set comprising a stator core, which drives the fan, an insulator, and a substrate; and a venturi having a sleeve, into an inner peripheral side of which a bearing is inserted to support the rotating shaft and to an outer peripheral side of which the stator core is fixed, the venturi being formed on one side thereof with an air suction opening and on the other side thereof with an air discharge mouth, wherein a space is provided between the stator core and the sleeve.

2. The axial fan motor according to claim 1, wherein one or more stoppers is provided on an upper portion of the sleeve positioned centrally of the venturi, and the stator substrate set is provided with a notch or notches, which can pass through the stopper or stoppers, and a spring, which supports the stator substrate set, is provided on a lowermost portion of the sleeve of the venturi, and the stator substrate set is mounted from above the sleeve to bring the insulator into contact with an underside of the stopper or stoppers.

3. The axial fan motor according to claim 2, wherein the spring passes through the sleeve, and the stator core and the substrate are fitted onto the sleeve and to be rotated and mounted so that the insulator comes into contact with the underside of the stopper or stoppers.

4. The axial fan motor according to claim 2, wherein a washer is mounted between the insulator and the underside of the stopper or stoppers.

5. The axial fan motor according to claim 2, wherein a space is provided above the insulator and sized to correspond to the stopper or stoppers, the space serving to prevent rotation of the stator substrate set.

6. The axial fan motor according to claim 2, wherein the insulator is provided with a member for prevention of inclination.

7. The axial fan motor according to claim 1, wherein a recess is provided above the insulator, the insulator is mounted to support a bearing having a shape fitted into the recess, and the bearing is put on the insulator.

8. The axial fan motor according to claim 2, wherein Lap>0 where Lap indicates a distance in an axial direction between an end surface of an inner cylindrical portion of the venturi on a discharge side and a tip end of the vane.

9. The axial fan motor according to claim 7, wherein Lap>0 where Lap indicates a distance in an axial direction between an end surface of an inner cylindrical portion of the venturi on a discharge side and a tip end of the vane.

10. The axial fan motor according to claim 2, wherein the vane is mounted to meet $\Delta\theta>0$ where $\Delta\theta$ indicates an angle formed between a straight line connecting between a point of intersection of a leading edge of the vane and a boundary of the hub and the vane, and a center of rotation of the fan, and a straight line T connecting between a point of intersection of a trailing edge of the vane and a tip of the vane, and the center of rotation of the fan, and a direction of rotation is defined to be positive.

11. The axial fan motor according to claim 7, wherein the vane is mounted to meet $\Delta\theta>0$ where $\Delta\theta$ indicates an angle formed between a straight line connecting between a point of intersection of a leading edge of the vane and a boundary of the hub and the vane, and a center of rotation of the fan, and a straight line T connecting between a point of intersection of a trailing edge of the vane and a tip of the vane, and the center of rotation of the fan, and a direction of rotation is defined to be positive.

* * * * *